(12) United States Patent
Lee et al.

(10) Patent No.: US 6,876,764 B2
(45) Date of Patent: Apr. 5, 2005

(54) METHOD AND APPARATUS FOR GENERATING WHITE COMPONENT AND CONTROLLING THE BRIGHTNESS IN DISPLAY DEVICES

(75) Inventors: Seong-deok Lee, Kyungki-do (KR); Chang-young Kim, Kyungki-do (KR); Du-sik Park, Kyungki-do (KR); Yang-seock Seo, Seoul (KR); Jeong-yeop Kim, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/376,485

(22) Filed: Mar. 3, 2003

(65) Prior Publication Data

US 2003/0128872 A1 Jul. 10, 2003

Related U.S. Application Data

(62) Division of application No. 09/562,432, filed on May 1, 2000.

(30) Foreign Application Priority Data

Oct. 8, 1999 (KR) ........................................ 1999-43481

(51) Int. Cl.[7] .................................................. G06K 9/00
(52) U.S. Cl. ...................................... 382/162; 358/516
(58) Field of Search .............................. 382/162–167; 358/515–523; 348/223.1–224.1

(56) References Cited

U.S. PATENT DOCUMENTS

| | | | |
|---|---|---|---|
| 4,937,682 A | * | 6/1990 | Dalton ........................ 348/461 |
| 5,233,385 A | | 8/1993 | Sampsell |
| 5,499,325 A | | 3/1996 | Dugan, Jr. |
| 5,589,879 A | * | 12/1996 | Saito et al. ............... 348/223.1 |
| 5,751,349 A | | 5/1998 | Matsui et al. |
| 5,929,843 A | | 7/1999 | Tanioka |
| 5,995,142 A | * | 11/1999 | Matsufune ............... 348/223.1 |
| 6,108,053 A | * | 8/2000 | Pettitt et al. ................ 348/748 |
| 6,392,717 B1 | | 5/2002 | Kunzman |
| 6,453,067 B1 | | 9/2002 | Morgan et al. |
| 6,650,363 B1 | | 11/2003 | Ukita |
| 6,724,934 B1 | | 4/2004 | Lee et al. |

FOREIGN PATENT DOCUMENTS

JP        411262023 A   *   9/1999   ............ H04N/9/07

* cited by examiner

*Primary Examiner*—Jingge Wu
(74) *Attorney, Agent, or Firm*—Burns, Doane, Swecker & Mathis, L.L.P.

(57) ABSTRACT

A method and apparatus for generating a white signal component and for controlling the brightness of an image are provided. In the above method and apparatus, the brightness increases of Red, Green and Blue, the saturations of which are not decreased from an input image are calculated using a vector, and the minimum value of such increases is utilized as the input value for the white component. Further, by adding brightness control components of RGB color to the input RGB signals, brightness increases in the direction of the original colors instead of the achromatic one are possible, which is the way the white component is added so as to increase the luminance of color display devices representing a color using a color filter such a flat panel display. Accordingly, a color saturation of the image is not decreased even with addition of the achromatic color component. In other words, in converting a signal from the three colors such as RGB into the four colors inclusive of white component, the present invention is capable of increasing the brightness without reduction of saturation as well as extracting the white component in an easy and efficient way, which enhances the performance of image processing apparatuses such as color display devices and the like.

8 Claims, 4 Drawing Sheets

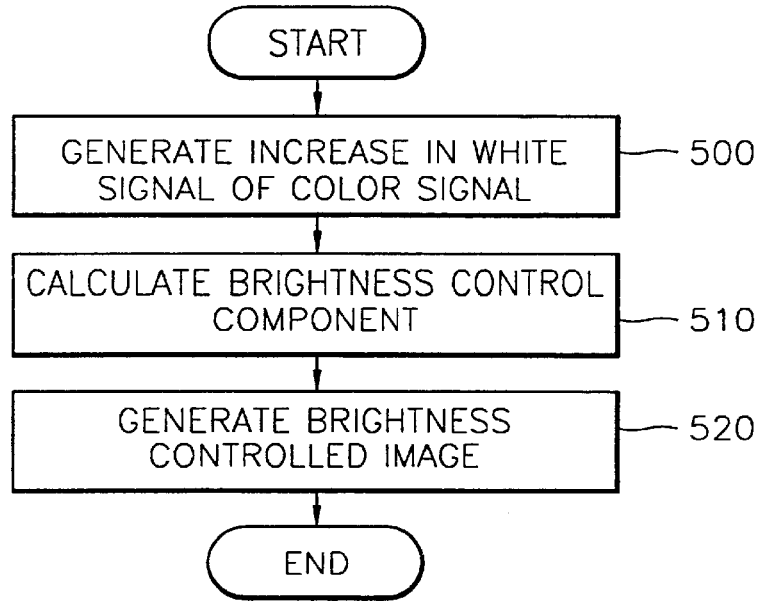
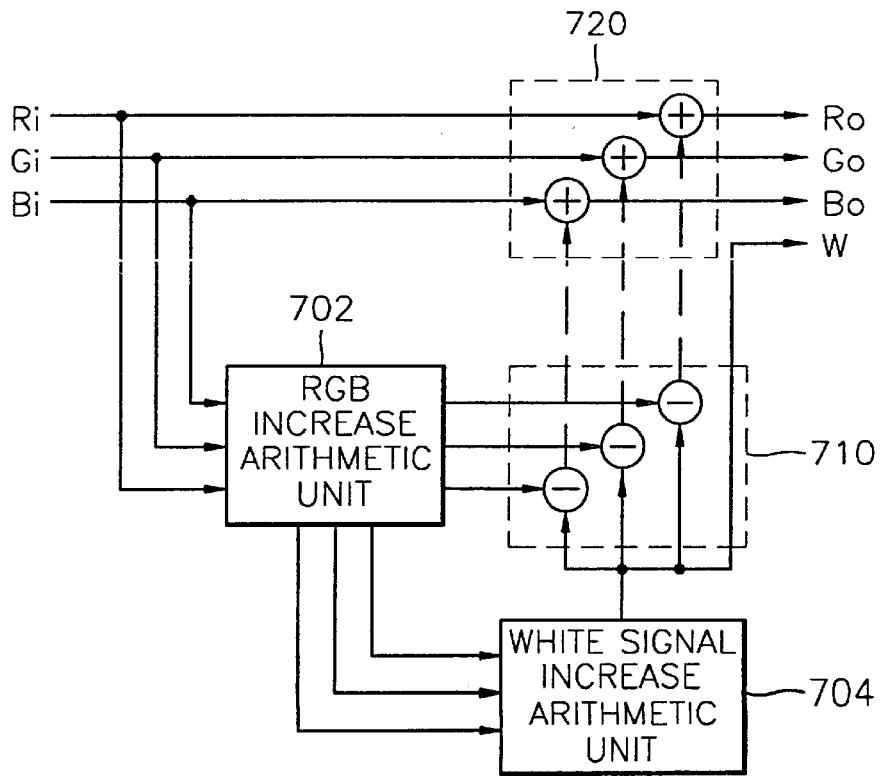

METHOD AND APPARATUS FOR GENERATING WHITE COMPONENT AND CONTROLLING THE BRIGHTNESS IN DISPLAY DEVICES

This application is a divisional of application Ser. No. 09/562,432, filed on May 1, 2000.

The following is based on Korean Patent Application No. 99-43481 filed Oct. 8, 1999, herein incorporated by reference.

BACKGROUND OF THE INVENTION

1. Field of the Invention

The present invention relates to an image processing apparatus and more particularly, to a method and apparatus for generating white color component and controlling the brightness in display devices.

2. Description of the Related Art

In a color display monitor or a color television, if a flat-panel display or color wheel filter is used, it is easier to increase the screen size, but the brightness of output image is deteriorated in comparison with use of a cathode-ray tube. To overcome such a drawback, a four-color output system in which white color component is added to the three primary colors of RGB (Red, Green, and Blue) is employed. The white component can be obtained by having a white light transmitted or reflected onto a white filter, which increases the overall brightness of the screen in display system. Therefore, what is needed is a method for extracting the white component from the RGB three primary colors to form the four primary color signals.

In an effort to increase the luminance of output image, a conventional method for using white filter in addition to RGB three color filters has been proposed by US-based Texas Instruments Inc., (U.S. Pat. No. 5,233,385). This method adopts a field-sequential way in which a white filter field or white frame is added by spatially or temporally dividing a color wheel or a video frame into four regions. As a result, the luminance of the output image can be increased in proportion to the size of the white field in image output systems. Such increase in luminance, however, signifies the increase of an achromatic color component, which causes color saturation of picture elements or pixels of an image to be reduced.

Another conventional method therefor has been presented by Japan-based Canon K. K., (U.S. Pat. No. 5,929,843). This method implemented by a binary liquid-crystal display includes the steps of extracting white component data from R, G, B color data, performing a pseudo half-tone process on the white component, and transmitting the suppressed white component to the display dot of RGB and White, in which case Red, Green, Blue and White are pixel units. The main feature of this method is in the non-linear conversion of the minimum value with the white component data obtained among the R, G, B color data, where non-linear models are gamma, offset, and scale. The above method contributes to turning the previous field-sequential based white color supplement into a pixel unit while adjusting the applied amount of white component depending upon a preset model. However, it raises a problem in that a decrease in color saturation with addition of white color fails to be noticed.

SUMMARY OF THE INVENTION

To solve the above problem, it is an objective of the present invention to provide a method and apparatus for converting a predetermined color signal into one including white signal.

It is another objective to provide a method and apparatus for increasing the brightness of an image without deteriorating color saturation.

Accordingly, to achieve the above objective of the invention, there is provided a method for generating a white signal component from a color signal including the steps of: calculating increases in the brightness of the primary color components constituting the color signal on the basis of each color component; extracting an increase in the white signal component from the brightness increases of the primary color components; and setting the increase in the white signal component as the white signal component of the color signal.

Where the color signal is comprised of Red, Green, Blue three-color signals, b1 is a predetermined constant indicative of scale, Brt is the increase in the brightness of an achromatic color depending upon input data, Ri, Gi, and Bi are vectors of the three primary color components, and $$M1 = \sqrt{(Ri \cdot Ri + Gi \cdot Gi + Bi \cdot Bi)^2},$$

in the step of calculating the brightness increases of the primary color components constituting the color signal on the basis of each color component, it is preferable to determine vR, vG, and vB, indicative of the respective increases of the brightness in red, green, and blue components of the color signal, as vR=b1*Brt*Ri/M1, vG=b1*Brt*Gi/M1, vB=b1*Brt*Bi/M1, respectively.

Furthermore, where the color signal is comprised of the three colors such as Red, Green and Blue, vR, vG and vB are the respective brightness increases of Red, Green and Blue primary color components, and c1 is a predetermined constant indicative of scale, in the step of extracting an increase in the white signal component, it is preferable to determine such increase W as the result of multiplying the constant c1 by the lowest value among the brightness increases of the primary colors.

On top of that, where the color signal is comprised of the three colors such as Red, Green and Blue, vR, vG and vB, respectively, are the brightnesses of Red, Green and Blue primary color components, and b1, b2 and b3 are predetermined constants, it is preferable to determine such increase W as W=B1*vR+b2*vG+b3*vB in the step of extracting an increase in the white signal component.

To achieve the above objective of the invention, there is also provided an apparatus for generating a white signal component from a color signal including: a primary color component brightness increase arithmetic unit for calculating the brightness increases of the primary color components constituting the color signal on the basis of each color component; a white signal increase arithmetic unit for extracting an increase in the white signal component from the brightness increases of the primary color components; and a signal applying unit for setting the increase of the white signal component as the white signal component of the color signal.

Where the color signal is comprised of Red, Green, Blue three-color signals, b1 is a predetermined constant indicative of scale, Brt is the brightness increase of an achromatic color depending upon input data, Ri, Gi, and Bi are vectors of the three primary color components of the color signal, and $$M1 = \sqrt{(Ri \cdot Ri + Gi \cdot Gi + Bi \cdot Bi)^2},$$

it is preferable to have the primary color component brightness increase arithmetic unit determine vR, vG, and vB which are the respective increases of the brightness in red, green, and blue components of the color signal as vR=b1*Brt*Ri/M1, vG=b1*Brt*Gi/M1, vB=b1*Brt*Bi/M1, respectively.

Furthermore, where the color signal is comprised of the three colors such as Red, Green and Blue, vR, vG and vB are the respective increases in the brightnesses of Red, Green and Blue primary color components, and c1 is the predetermined constant indicative of scale, it is preferable to have the white signal increase arithmetic unit determine the white signal increase W as the value multiplying the constant c1 by the lowest value among the primary color brightness increases.

On top of that, where the color signal is comprised of the three colors such as Red, Green and Blue, vR, vG and vB are the respective increases in the brightnesses of Red, Green and Blue primary color components, and b1, b2 and b3 are predetermined constants, it is preferable to have the white signal increase arithmetic unit determine such increase W as W=b1*vR+b2*vG+b3*vB.

To achieve another objective of the invention, there is provided a method for controlling the brightness of an image including the steps of: calculating increases of primary color components constituting the image color signal on the basis of each primary color component to generate an increase in the white signal of the color signal; calculating brightness control components of the image by using the brightness increase of each primary color component and the increase of the white signal; and adding the image brightness control components to the image color signal to generate a brightness controlled image.

Where the color signal of the image is comprised of Red, Green, Blue three-color signals, b1 is a predetermined constant indicative of scale, Brt is the brightness increase of an achromatic color depending upon input data, Ri, Gi, and Bi are vectors of the three primary color components, and $$M1 = \sqrt{(Ri \cdot Ri + Gi \cdot Gi + Bi \cdot Bi)^2},$$

in the step of calculating the increase of the white signal, it is preferable to determine vR, vG, and vB, indicative of the respective brightness increases of red, green, and blue components of the color signal, as vR=b1*Brt*RI/M1, vG=b1*Brt*Gi/M1, vB=b1*Bit*Bi/M1, respectively.

Furthermore, where c1 is a predetermined constant indicative of scale, it is preferable to determine such increase W as the result of multiplying the constant c1 by the lowest value among the brightness increases of the primary colors, and where b2 and b3 are predetermined constants, it is preferable to determine such increase W as W=b1*vR+b2*vG+b3*vB.

Where the image color signal is comprised of three primary colors such as Red, Green and Blue, vR, vG, vB, and W are the respective brightness increases of Red, Green, Blue and White obtained from the step of generating the increase of the white component of the color signal, in the step of calculating the brightness control component of the image, it is preferable to determine Inc_R, Inc_G, and Inc_B which are the brightness control components of the primary colors Red, Green and Blue as Inc_R=vR−W, Inc_G=vG−W, Inc_B=vB−W, respectively.

Further, where the image color signal is comprised of three colors such as Red, Green and Blue, Ri, Gi, and Bi are the respective vectors of the three primary color components, Inc_R, Inc_G, and Inc_B are the respective brightness control components of the primary colors Red, Green and Blue, and d1, d2 and d3 are predetermined constants, in the step of generating a brightness-controlled image, it is preferable to determine the primary color signal of the brightness-controlled output Ro, Go and Bo as Ro=Ri+d1*Inc_R, Go=Gi+d2*Inc_G, Bo=Bi+d3*Inc_B, respectively.

To achieve another objective of the invention, there is also provided an apparatus for controlling the brightness of an image including: a color signal brightness increase arithmetic unit for calculating brightness increases of primary color component constituting the image color signal on the basis of each primary color component to generate an increase in the white signal of the color signal; an image brightness control arithmetic unit for calculating the image brightness control components using the brightness increases of each primary color component and the white signal; and a control signal generator for adding the image brightness control component to the image color signal to generate a brightness controlled image.

Where the image color signal is comprised of three primary colors such as Red, Green and Blue, vR, vG, vB, and W are the respective brightness increases of Red, Green, Blue and White, which are obtained from the image color signal brightness increase arithmetic unit, it is preferable to have the image brightness control arithmetic unit determine Inc_R, Inc_G, and Inc_B indicative of the brightness control components of the primary colors Red, Green and Blue as Inc_R=vR−W, Inc_G=vG−W, Inc_B=vB−W, respectively.

Further, where the image color signal is comprised of three colors such as Red, Green and Blue, Ri, Gi, and Bi are the respective vectors of the three primary color components, Inc_R, Inc_G, and Inc_B are the respective brightness control components of the primary colors Red, Green and Blue, and d1, d2 and d3 are predetermined constants, it is preferable to have the control signal generator determine Ro, Go and Bo, indicative of the primary color signals of the brightness controlled output, as Ro=Ri+d1*Inc_R, Go=Gi+d2*Inc_G, Bo=Bi+d3*Inc_B, respectively.

BRIEF DESCRIPTION OF THE DRAWINGS

The above objectives and advantages of the present invention will become more apparent by describing in detail a preferred embodiment thereof with reference to the attached drawings in which:

FIG. 5 is a flowchart illustrating a method for controlling the brightness of an image;

FIG. 7 is a diagram illustrating another preferred embodiment realizing the method illustrated in FIG. 5.

DETAILED DESCRIPTION OF THE INVENTION

Figure 1:
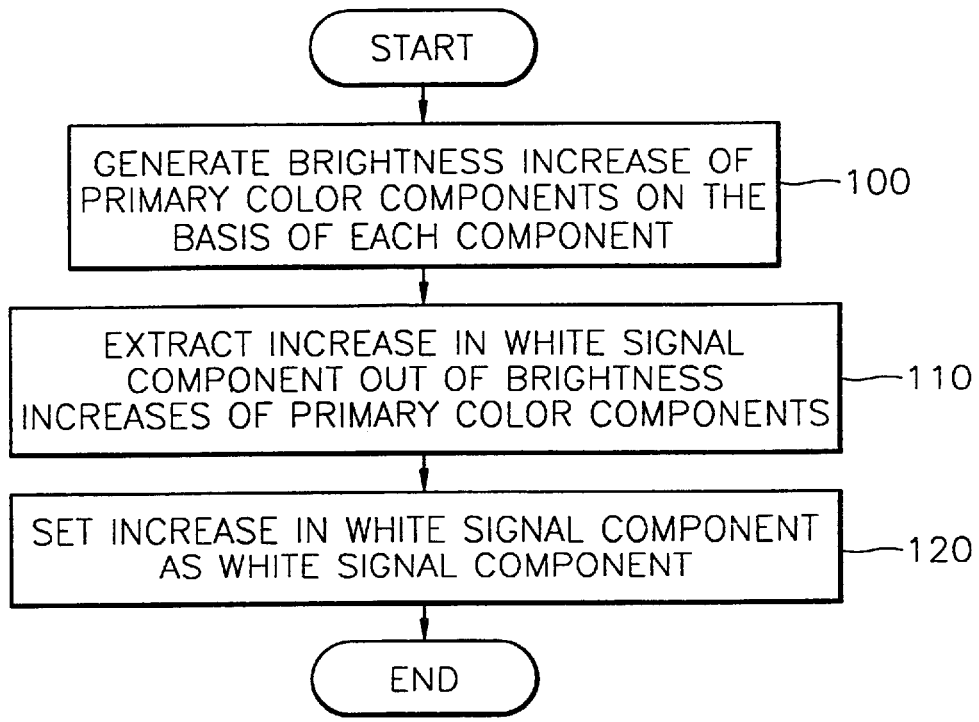
FIG. 1 is a flowchart illustrating a method for generating a white signal component according to the present invention.

Referring to FIG. 1, which is a flowchart showing a method for generating a white signal component according to the present invention, the method includes the steps of generating the brightness increase of base color components constituting a predetermined color signal on the basis of each component (step 100), extracting the increase in the white signal component out of the bright increases of the base color components (step 110), and setting the increase in the white signal component as the white signal component of the predetermined color signal (step 120).

Figure 2:
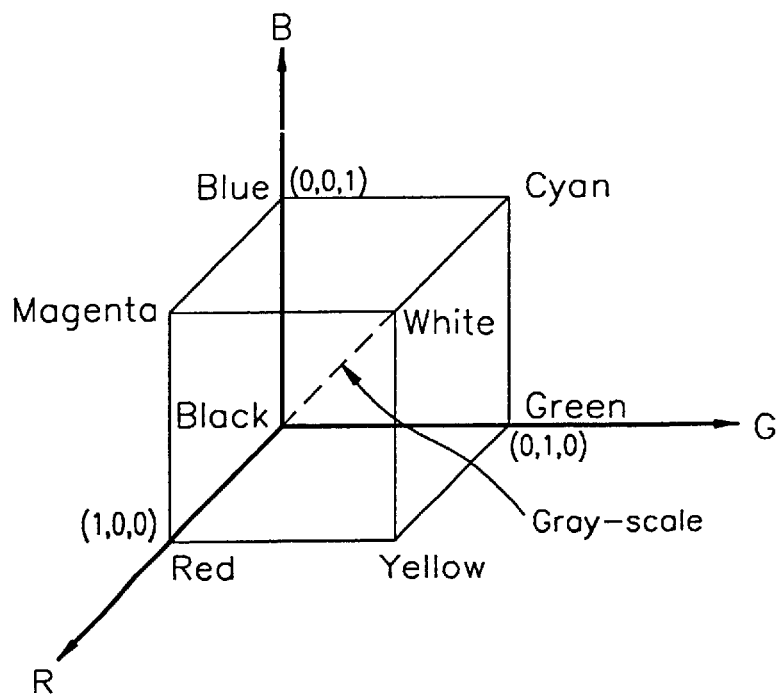
FIG. 2 is a diagram illustrating a color model in RGB color space.
Figure 3:
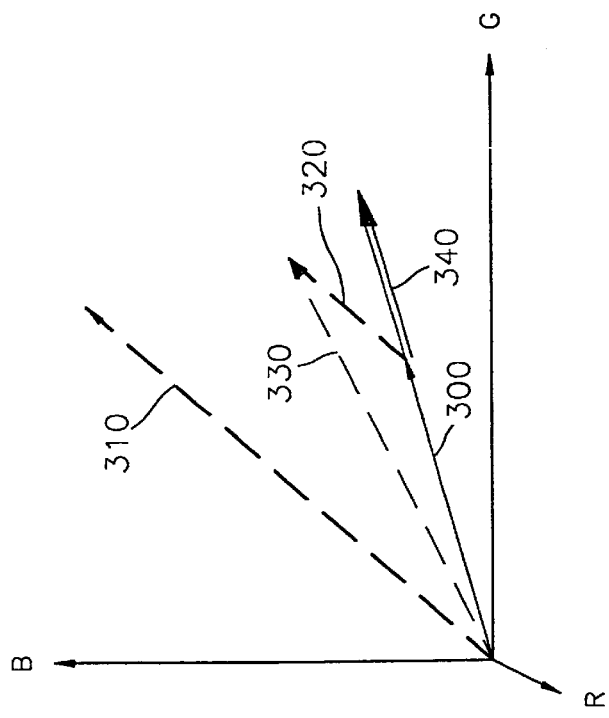
FIG. 3 is a diagram illustrating the relationship between a color represented by RGB vector and an achromatic color signal of a white component.

In FIG. 2 illustrating a color model in RGB color space, the origin is black, all colors are characterized as a color space shown in FIG. 2 with the axis of red, green and blue colors which are the base colors of the RGB space, and a line from black to white represents the gray scale. In FIG. 3 illustrating the relationship between a color represented by an RGB vector and an achromatic color signal of a white component, an arbitrary color is characterized as an RGB vector 300 with a gray scale vector 310 being represented together. In order to increase the brightness of an output color, addition to a white channel results in the sum of the RGB vector 300 and an achromatic color vector 320, which is a brightness increasing component, to form a new RGB vector 330. Then, a color represented by the new RGB vector 330 is increased in terms of brightness compared to the one represented by the previous RGB vector 300. The achromatic color vector 320 is parallel to the gray scale vector 310.

It can be observed that the length of the newly formed RGB vector 330 is longer than that of the existing output color vector 300. Such change in the vector length in the RGB color space means a color luminance increase. Further, a remarkable difference between the vectors 300 and 330 exists in the direction of the vector; that is, the new RGB vector 330 points more toward the direction of the achromatic color, which means a reduction in the saturation in the RGB color space. As saturation of the original color becomes higher or the luminance increase becomes larger, saturation is decreased to a larger extent.

The present invention, in order to avoid such saturation decrease resulting from the luminance increase, as shown in FIG. 3, employs a method of producing a chromaticity-maintenance vector 340 through projection of the achromatic vector 320 onto the previous RGB vector 300, instead of using the achromatic vector 320 itself, and extracting the value of the white signal component on the chromaticity-maintenance vector 340.

To this end, in the step 100, vR, vG and vB, which are the respective luminance increases of the base color components red, green and blue, are computed as follows:

$$vR = b1 * Brt * Ri/M1$$
$$vG = b1 * Brt * Gi/M1$$
$$vB = b1 * Brt * Bi/M1 \quad (1)$$

where b1 is a predetermined constant indicative of scale, and Ri, Gi and Bi are the base components of the three primary colors of the input RGB signal 300. M1 and Brt indicate the square of magnitude of RGB vector and the luminance increase of an achromatic color, respectively, of which Brt is computed as follows:

$$Brt = a1 * Ri + a2 * Gi + a3 * Bi \quad (2)$$

where a1, a2, and a3 are predetermined constants, and Brt is represented as a function of Ri, Gi, and Bi. Contrarily, Brt can be a predetermined constant which varies depending on the applied field to be realized. For example, the value of Brt can be determined in a way to multiply a predetermined constant by the minimum value of vR, vG and vB.

M1 of the mathematical formula (1) is represented as follows:

$$M1 = \sqrt{(Ri \cdot Ri + Gi \cdot Gi + Bi \cdot Bi)^2} \quad (3)$$

where Ri.Ri is the inner product of the Ri vectors which is the square of the magnitude of Ri vector. Thus, M1 is the square of the magnitude of RGB vector.

In the step 110, the luminance increase W of the white signal is extracted out of those of the base colors as set forth in the mathematical formula:

$$W = c1 * \min(vR, vG, vB) \quad (4)$$

In this case, min( ) is a function for selecting the minimum out of the three values, and c1 is a predetermined constant indicative of scale which means to what extent the white signal increase is applied. Alternatively, W is expressed as follows:

$$W = b1 * vR + b2 * vG + b3 * vB \quad (5)$$

In this case, b1, b2 and b3 are predetermined constants. According to formula (4), W is determined by one of vR, vG and vB while according to formula (5), W is determined by the combination of those three vectors In the step 120, the white signal component increase W is set as the white signal component of the color signal. Such increase W becomes the applied value of the white signal channel determined by a first input RGB signal.

Figure 4:
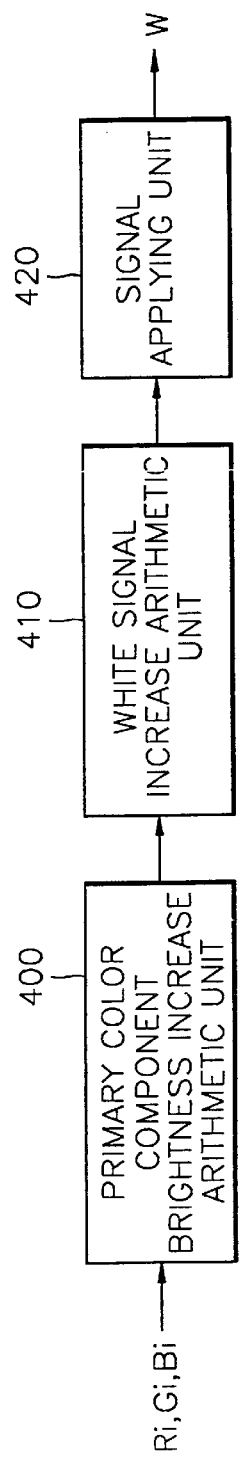
FIG. 4 is a block diagram of an apparatus using the method illustrated in FIG. 1.

FIG. 4 is a block diagram of an apparatus employing the method shown in FIG. 1. The apparatus includes a primary color component brightness increase arithmetic unit 400 for calculating increases in the brightnesses of the primary color components constituting a color signal on the basis of each color component, a white signal increase arithmetic unit 410 for extracting the brightness increase of the white signal component from the increases of the primary color components, and a signal applying unit 420 for setting the increase in the white signal component as the white signal component of the color signal. The primary color component brightness increase arithmetic unit 400 calculates vR, vG, and vB which are the brightness increases of the respective RGB base color components. The white signal increase arithmetic unit 410 extracts the white signal increase out of the increases vR, vG and vB, and the signal applying unit 420 sets the white signal increase as a white signal component.

Referring to FIG. 5, which is a flowchart illustrating a method for controlling the image brightness, the method includes the steps of calculating increases of primary color component constituting the image color signal on the basis of each primary color component to generate an increase in the white signal in the color signal (step 500), calculating the image brightness control component by using the brightness increase of each primary color component and the increase of the white signal (step 510), and adding the image brightness control component to the image color signal to generate the brightness controlled image (step 520).

Specifically, in the step 510, Inc_R, Inc_G, and Inc_B, which are the brightness control components of each RGB channel, are computed according to the mathematical formula (6), using vR, vG, vB, and W, which are the luminance increases of the three base colors RGB and the white signal component, respectively, obtained through the mathematical formulae 1 and 4 or 5:

$$Inc\_R=vR-W$$
$$Inc\_G=vG-W$$
$$Inc\_B=vB-W \quad (6)$$

In the step 520, Ri, Gi and Bi, which are the base input signals of RGB channels, are operated together with Inc_R, Inc_G, and Inc_B, which are the brightness control components of each RGB channel to generate Ro, Go and Bo, which are the RGB primary color signals of the brightness controlled output as set forth in the mathematical formula (7):

$$Ro=Ri+d1*Inc\_R$$
$$Go=Gi+d2*Inc\_G$$
$$Bo=Bi+d3*Inc\_B \quad (7)$$

In this case, d1, d2 and d3 are predetermined constants which can adjust the scale of the RGB brightness control components. These converted signals Ro, Go, Bo and W are transmitted to an image output device such as a liquid crystal display.

Figure 6:
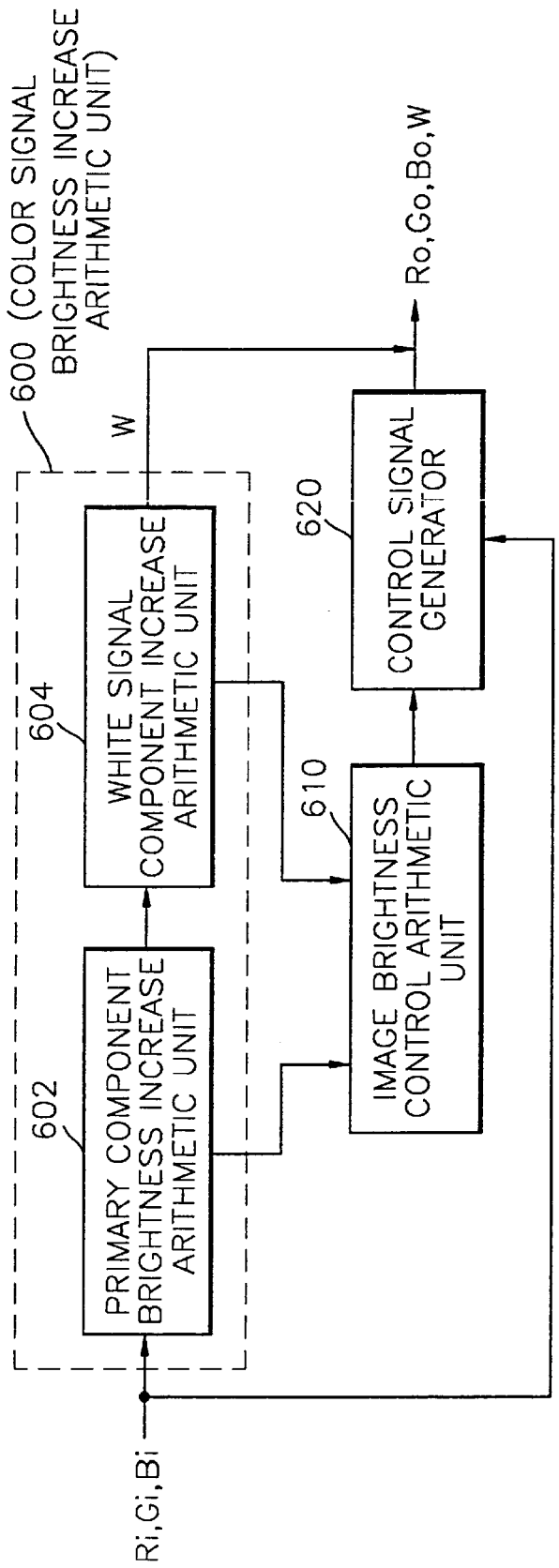
FIG. 6 is a block diagram of an apparatus using the method illustrated in FIG. 5.

FIG. 6 is a block diagram of an apparatus implementing the method shown in FIG. 5. The apparatus includes a color signal brightness increase arithmetic unit 600 for calculating brightness increases of primary color components constituting an image color signal on the basis of each primary color component to generate an increase in the white signal of the image color signal, an image brightness control arithmetic unit 610 for calculating the image brightness control components using the brightness increases of each primary color component and increase in the white signal, and a control signal generator 620 for adding the image brightness control component to the image color signal to generate the brightness controlled image. Preferably, the color signal brightness increase arithmetic unit 600 may include the primary component brightness increase arithmetic unit 602 and the white signal component increase arithmetic unit 604. The arithmetic units perform the same function as the arithmetic units shown in FIG. 4.

The image brightness control arithmetic unit 610 calculates Inc_R, Inc_G, and Inc_B, which are the brightness control components of each RGB channel, and the control signal generator 620 generates Ro, Go and Bo which are the RGB primary color signals of the brightness controlled output.

FIG. 7 is a diagram of another preferred embodiment realizing the method shown in FIG. 5. A RGB increase arithmetic unit 702 and a white signal increase arithmetic unit 704 perform the same function as the primary component brightness increase arithmetic unit 602 and the element 604, respectively, shown in FIG. 6 to output the white signal component W, a subtracter 710 deducts the white signal increase from the respective RGB increases, and an adder 720 adds signals derived by Ri, Gi and Bi, for example, d1×Inc_R, d2×Inc_G, and d3×Inc_B to Ri, Gi, and Bi, respectively. As a result, the brightness controlled signals Ro, Go and Bo, and the white signal component W are output.

In the same manner, the spirit of the present invention can be applied to YCrCb, YIQ, HLS or HIS color spaces or CIELAB or CIELUV related standard color space although the invention is described with reference to the RGB color space.

According to the present invention, the brightness increases of Red, Green and Blue, the saturations of which are not decreased from an input image, are calculated using a vector, and the minimum value of such increases is utilized as the input value for the white component. Further, by adding brightness control components of RGB color to the input RGB signals, the brightness increases in the direction of the original colors instead of the achromatic one are possible, which is the way the white component is added so as to increase the luminance of color display devices representing a color using a color filter such a flat panel display. Accordingly, a color saturation of the image is not decreased even with the addition of the achromatic color component.

In other words, in converting a signal from the three colors such as RGB into the four colors inclusive of, white component, the present invention is capable of increasing the brightness without a reduction in the saturation as well as extracting the white component in an easy and efficient way, which enhances the performance of image processing apparatuses such as color display devices and the like.

The respective elements of the apparatuses according to the present invention can be realized as hardware by using PLD or ASIC in the embodiment where color conversion speed is of importance, while the elements can be embodied as software where speed is not as important.

While this invention has been particularly shown and described with reference to preferred embodiments thereof, it should be understood that various alternatives and modifications can be devised by those skilled in the art without departing from the spirit and scope of the invention as defined by the appended claims.

What is claimed is:

1. A method of generating a white signal component from a color signal comprising the steps of:
   (a) calculating the brightness increases of primary color components constituting the color signal on the basis of each color component;
   (b) extracting an increase in the white signal component from the brightness increases of the primary color components; and
   (c) setting the increase in the white signal component as the white signal component of the color signal,
   wherein, in the step (a), where the color signal is comprised of Red, Green, Blue three-color signals, b1 is a predetermined constant indicative of scale, Brt is the increase in the brightness of an achromatic color according to input data, Ri, Gi, and Bi are vectors of the three primary color components, and $$M1 = \sqrt{(Ri \cdot Ri + Gi \cdot Gi + Bi \cdot Bi)^2},$$

vR, vG, and vB which are the respective brightness increases in red, green, and blue components of the color signal, are determined as vR=b1*Brt*Ri/M1, vG=b1*Brt*Gi/M1, vB=b1*Brt*Bi/M1, respectively.

2. The method of claim 1, wherein Brt, which is the brightness increase of the achromatic color, is determined as Brt=a1*Ri+a2*Gi+a3*Bi, when a1, a2 and a3 are predetermined constants.

3. A method of generating a white signal component from a color signal comprising the steps of:
   (a) calculating the brightness increases of primary color components constituting the color signal on the basis of each color component;

(b) extracting an increase in the white signal component from the brightness increases of the primary color components; and (c) selling the increase in the white signal component as the white signal component of the color signal, wherein, in the step (b), where the color signal is comprised of three colors such as Red, Green and Blue, vR, vG and vB are the respective brightness increases of Red, Green and Blue primary color components, and c1 is a predetermined constant indicative of scale, the white signal increase W is determined as the value multiplying the constant c1 by the lowest value among the primary color brightness increases.

4. A method of generating a white signal component from a color signal comprising the steps of:

(a) calculating the brightness increases of primary color components constituting the color signal on the basis of each color component;

(b) extracting an increase in the white signal component from the brightness increases of the primary color components; and (c) setting the increase in the white signal component as the white signal component of the color signal, wherein, in the step (b), where the color signal is comprised of three colors such as Red, Green and Blue, the increases in the brightnesses of Red, Green and Blue primary color components are indicated as vR, vG, and vB, respectively, b1, b2 and b3 are predetermined constants, and the white signal increase W is determined as $W = b1*vR + b2*vG + b3*vB$.

5. An apparatus for generating white signal component from a color signal, the apparatus comprising:

(a) a primary color component brightness increase arithmetic unit for calculating increases in the brightnesses of the primary color components constituting the color signal on the basis of each color component;

(b) a white signal increase arithmetic unit for extracting the increase in the white signal component from the increases of the primary color components; and (c) a signal applying unit for setting the increase in the white signal component as the white signal component of the color signal, wherein, where the color signal is comprised of Red, Green, Blue three-color signals, b1 is a predetermined constant indicative of scale, Brt is the brightness increase of an achromatic color according to input data, Ri, Gi, and Bi are vectors of the three primary color components, and $$M1 = \sqrt{(Ri \cdot Ri + Gi \cdot Gi + Bi \cdot Bi)^2},$$

the primary color component brightness increase arithmetic unit determines vR, vG, and vB which are the increases of the brightness in red, green, and blue components of the color signal as $vR = b1*Brt*Ri/M1$, $vG = b1*Brt*Gi/M1$, $vB b1*Brt*Bi/M1$, respectively.

6. The apparatus of claim 5, wherein Brt, which is the brightness increase of the achromatic color, is determined as $Brt = a1*Ri + a2*Gi + a3*Bi$ when a1, a2 and a3 are predetermined constants.

7. An apparatus for generating white signal component from a color signal, the apparatus comprising:

(a) a primary color component brightness increase arithmetic unit for calculating increases in the brightnesses of the primary color components constituting the color signal on the basis of each color component;

(b) a white signal increase arithmetic unit for extracting the increase in the white signal component from the increases of the primary color components; and (c) a signal applying unit for selling the increase in the white signal component as the white signal component of the color signal, wherein, where the color signal is comprised of three colors such as Red, Green and Blue, vR, vG and vB are the respective increases in the brightnesses of Red, Green and Blue primary color components, and c1 is a predetermined constant indicative of scale, the white signal increase arithmetic unit determines the white signal increase W as the value multiplying the constant c1 by the lowest value among the primary color brightness increases.

8. An apparatus for generating white signal component from a color signal, the apparatus comprising:

(a) a primary color component brightness increase arithmetic unit for calculating increases in the brightnesses of the primary color components constituting the color signal on the basis of each color component;

(b) a white signal increase arithmetic unit for extracting the increase in the white signal component from the increases of the primary color components; and (c) a signal applying unit for setting the increase in the white signal component as the white signal component of the color signal, wherein, where the color signal is comprised of three colors such as Red, Green and Blue, vR, vG and vB are the respective increases in the brightnesses of Red, Green and Blue primary color components, b1, b2 and b3 are predetermined constants, and the white signal increase arithmetic unit determines the brightness increase W of the white signal as $W = b1*vR + b2*vG + b3*vB$.

* * * * *